United States Patent [19]
Guttag et al.

[11] Patent Number: 5,162,784
[45] Date of Patent: Nov. 10, 1992

[54] GRAPHICS DATA PROCESSING APPARATUS WITH DRAW AND ADVANCE OPERATION

[75] Inventors: Karl M. Guttag, Missouri City, Tex.; Mark F. Novak, Ypsilanti, Mich.; Michael D. Asal, Sugarland, Tex.; Neil Tebbutt, Mas les Pounes Chemin Des Mimosas, France; Jerry R. Van Aken, Sugarland, Tex.

[73] Assignee: Texas Instruments Incorporated, Dallas, Tex.

[21] Appl. No.: 522,409

[22] Filed: May 10, 1990

Related U.S. Application Data

[63] Continuation of Ser. No. 449,225, Dec. 6, 1989, which is a continuation of Ser. No. 366,308, Jun. 13, 1989, abandoned, which is a continuation of Ser. No. 245,980, Sep. 16, 1988, abandoned, which is a continuation of Ser. No. 804,203, Dec. 3, 1985, abandoned.

[51] Int. Cl.$^5$ .............................................. G09G 1/06
[52] U.S. Cl. .................................... 340/724; 340/740; 340/800
[58] Field of Search ............... 340/701, 703, 721, 724, 340/726, 729, 727, 728, 747, 750, 790, 740, 800; 364/518, 521; 395/127, 138

[56] References Cited

U.S. PATENT DOCUMENTS

| | | | |
|---|---|---|---|
| 3,471,848 | 10/1969 | Manber | 340/748 |
| 3,952,297 | 4/1976 | Stauffer et al. | 340/740 |
| 4,197,590 | 4/1980 | Sukonick et al. | 340/726 |
| 4,320,395 | 3/1982 | Meissen et al. | 340/726 |
| 4,613,852 | 9/1986 | Maruko | 340/747 |
| 4,636,783 | 1/1987 | Omachi | 340/724 |
| 4,649,377 | 3/1987 | Urabe | 340/721 |
| 4,653,020 | 3/1987 | Cheselka et al. | 340/747 |
| 4,680,643 | 7/1987 | Horiguchi | 340/724 |
| 4,779,210 | 10/1988 | Katsura et al. | 364/521 |
| 4,862,150 | 8/1989 | Katsura et al. | 340/703 |

OTHER PUBLICATIONS

Jerry R. van Aken–"An Efficient Ellipse-Drawing Algorithm"–IEEE CG & A–1984 –pp. 24–35.
Guttag et al. –"3D-Imaging of the Intracranial Structures"–IEEE Computer Society–1981–pp. 27–34.
Guttag et al.–"Video Display Processor Simulates Three Dimensions"–Electronics–Nov. 20, 1980 –pp. 123–126.

Primary Examiner—Ulysses Weldon
Assistant Examiner—M. Fatahiyar
Attorney, Agent, or Firm—Lawrence J. Bassuk; Richard L. Donaldson

[57] ABSTRACT

The graphics data processor of the present invention offers as a single instruction in its instruction set a draw and advance operation. A first data register stores a set of X and Y coordinates. In a first embodiment, a predetermined color code is stored at the pixel address of a bit mapped display memory indicated by the X and Y coordinates the first data register upon execution of the the draw and advance instruction. The X and Y coordinates stored in the first data register are then advanced by addition of X and Y coordinates stored in a second data register. A second embodiment is similar except that the color code stored at the X and Y coordinates of the first date register is recalled for combining with the predetermined color code and the combined result stored at that pixel location. The predetermined color code is preferrably stored in another data register. By proper selection of the X and Y coordinate data stored in the second data register either the X or the Y coordinate may be altered alone or both may be simultaneously changed. Provision of signed X and Y coordinate values in the second register enables either the X or Y coordinate to be incremented of decremented. This instruction serves to enhance the speed at which a line or computed curve may by drawn in the bit mapped display.

5 Claims, 11 Drawing Sheets

GRAPHICS DATA PROCESSING APPARATUS WITH DRAW AND ADVANCE OPERATION

This application is a continuation of application Ser. No. 07/449,225, filed Dec. 6, 1989 which is a continuation of Ser. No. 07/366,308 filed Jun. 13, 1989, which is a continuation of Ser. No. 07/245,980, filed Sept. 16, 1988, which is a continuation of Ser. No. 06/804,203 filed Dec. 3, 1985, all now abandoned.

CROSS REFERENCE TO RELATED APPLICATIONS

The present application is related to U.S. Pat. application Ser. No. 790,299 filed Oct. 22, 1985, entitled "Graphics Data Processing Apparatus Having Pixel to Window Compare Capability" by Karl M. Guttag, Michael D. Asal and Mark F. Novak, U.S. patent application Ser. No. 790,293 filed Oct. 22, 1985, entitled "Logic Circuit for a Pixel to Window Compare Capability" by Richard Simpson and Dyson Wilkes, U.S. patent application Ser. No. 795,158 filed Nov. 5, 1985, entitled "Graphics Data Processing Apparatus for Graphic Image Operations upon Data of Independently Selectable Pitch" by Karl M. Guttag, Michael D. Asal and Mark F. Novak, U.S. patent application Ser. No. 795,380 filed Nov. 6, 1985, entitled "Linked Cell Discharge Detector Having Improved Response Time" by Mohammed N. Maan, U.S. patent application Ser. No. 795,383 filed Nov. 6, 1985, entitled "Graphics Processing Apparatus Having Color Expand Operation for Drawing Color Graphics from Monochrome Data" by Karl M. Guttag, Michael D. Asal and Mark F. Novak, U.S. patent application Ser. No. 795,382 filed Nov. 6, 1985, entitled "Graphics Data Processing Apparatus Having Image Operations with Transparent Color Having a Selectable Number of Bits" by Karl M. Guttag, Michael D. Asal and Thomas Preston, U.S. patent application Ser. No. 804,204 filed Dec. 3, 1985, entitled "Graphics Processing Apparatus Having Instruction which Operates Separately on X and Y Coordinates of Pixel Location Registers" by Karl M. Guttag, Michael D. Asal, Neil Tebbutt and Mark F. Novak.

BACKGROUND OF THE INVENTION

The present invention relates to the field of computer graphics. In particular, this invention relates to the field of bit mapped computer graphics in which the computer memory stores data for each individual picture element or pixel of the display at memory locations that correspond to the location of that pixel on the display. The field of bit mapped computer graphics has benefited greatly from the lowered cost per bit of dynamic random access memory (DRAM). The lowered cost per bit of memory enables larger and more complex displays to be formed in the bit mapped mode.

The reduction in the cost per bit of memory and the consequent increase in the capacity of bit mapped computer graphics has led to the need for processing devices which can advantageously use the bit mapped memory in computer graphics applications. In particular, a type of device has arisen which includes the capacity to draw simple figures, such as lines and circles, under the control of the main processor of the computer. In addition, some devices of this type include a limited capacity for bit block transfer (known as BITBLT or raster operation) which involves the transfer of image data from one portion of memory to another, together with logical or arithmetic combinations of that data with the data at the destination location within the memory.

These bit-map controllers with hard wired functions for drawings lines and performing other basic graphics operations represent one approach to meeting the demanding performance requirements of bit maps displays. The built-in algorithms for performing some of the most frequently used graphics operations provides a way of improving overall system performance. However, a useful graphics system often requires many functions in addition to those few which are implemented in such a hard wired controller. These additional required functions must be implemented in software by the primary processor of the computer. Typically these hard wired bit-map controllers permit the processor only limited access to the bit-map memory, thereby limiting the degree to which software can augment the fixed set of functional capacities of the hard wired controller. Accordingly, it would be highly useful to be able to provide a more flexible solution to the problem of controlling the contents of the bit mapped memory, either by providing a more powerful graphics controller or by providing better access to this memory by the system processor, or both.

SUMMARY OF THE INVENTION

The present invention relates to the field of bit mapped graphics and particularly to the manipulation of pixel addresses in X Y coordinate form. A typical memory system used for storing the bit map would employ a linear address system in which the entire display array would occupy a linear array of address locations. However, in performing calculations regarding the addresses of individual pixels in a raster scanned display based upon bit mapped graphics it would be advantageous to operate in an X Y coordinate system which corresponds to the pixel position on the display. The drawing of figures based upon lines and curves from data calculations could benefit from the ability to employ an X Y coordinate system for addressing the memory location corresponding to a selected pixel.

Prior processors employed for bit mapped graphics fall into two categories. The first category is a programmed general purpose microprocessor. By providing a proper program a general purpose microprocessor can perform all the data manipulation needed to handle bit mapped graphics. This technique is less than ideal because the instruction set of a general purpose microprocessor is not optimized for graphics applications. As a consequence some very simple and fundamental graphics processes, such as manipulation of pixel data based upon X Y coordinate addresses requires programs of substantial length. As a consequence a general purpose microprocessor is slow in performing some simple graphics functions such as drawing a line or curve from a calculated formula and requires extensive programming to perform these functions.

The second prior type of processor employed in bit mapped graphics is a hardwired graphics controller. Such a hardwired graphics controller has special purpose hardware to perform a few tasks associated with the drawing of figures in a bit map. Typically these graphics controllers could draw lines and circles. These graphics controllers can thus relieve the main system processor of a portion of the graphics control burden.

The major problem with these graphics controllers is their lack of flexibility. Typically such graphics controllers must be fed the data specifying the type of curve to be drawn and its location in a particular fixed order. This rigid data requirement serves to slow the system speed as the main processor for the system must provide the required data type and order to the graphics controller. In addition, these graphics controllers have no flexibility in the type of algorithm employed for the drawing task. Some applications may require a fast drawing algorithm with a lesser concern about the accuracy whereas in other applications the accuracy of the figure is paramount and the speed is a secondary consideration. Thus use of such a graphics controller results in less flexibility in the graphics system.

The present invention provides the flexibility of a general purpose programmed microprocessor with the hardware resources of a graphics controller. In the present invention a special purpose instruction within an instruction set of a programmable processors provides a draw and advance operation. A first data register stores a set of base X and Y coordinates which specify the memory address and screen location of a selected pixel in the bit mapped display. A second data register stores a set of offset X and Y coordinates. Upon execution of the draw and advance instruction, a predetermined color code is combined with the color code stored at the address of a bit mapped display memory indicated by the X and Y coordinates the first data register. This involves recall of the pixel color code, combining the recalled color code with the predetermined color code and writing the combined color code into the same memory location. Substantially simultaneously, the X and Y coordinates stored in the first data register are advanced by independent addition of the offset X and Y coordinates stored in a second data register to the base coordinates stored in the first data register.

This instruction used in simple looping programs permits the rapid drawing of figures within the bit map. Because this instruction is used in conjunction with a fully programmable device, the flexibility to perform a variety of figure drawing algorithms is permitted without loss of speed in drawing.

BRIEF DESCRIPTION OF THE DRAWINGS

These and other objects of the present invention will be readily understood from the following description, taken in conjunction with the drawings in which.

DETAILED DESCRIPTION OF THE PREFERRED EMBODIMENT

Figure 1:
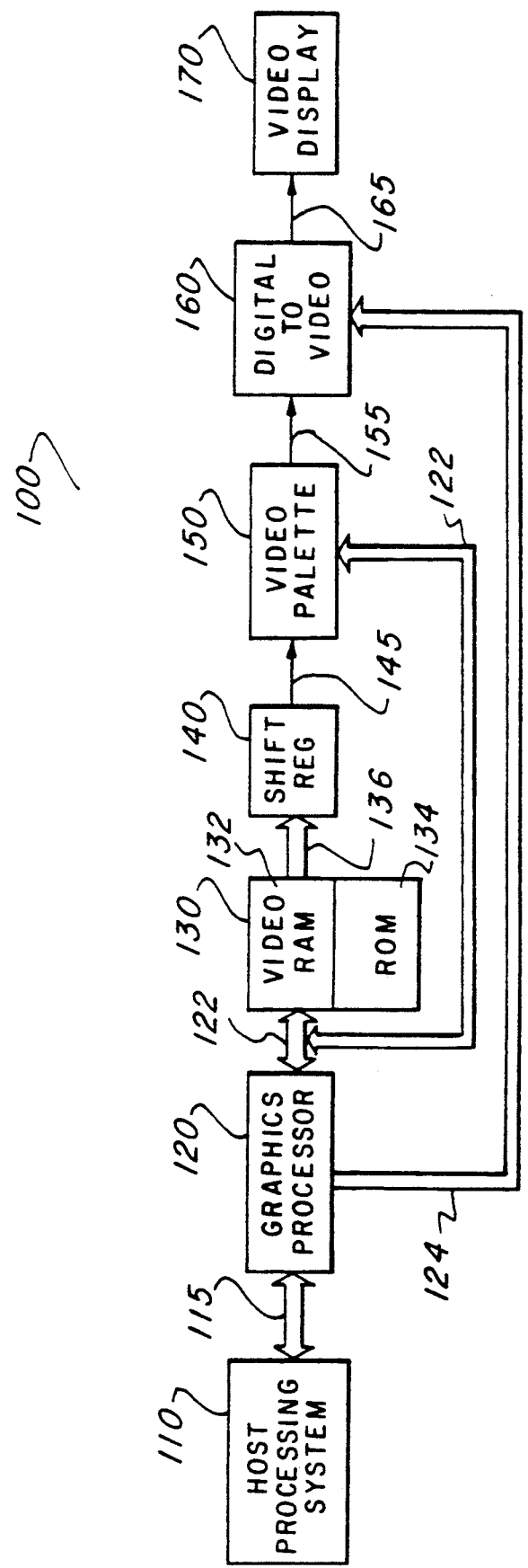
FIG. 1 illustrates a block diagram of a computer with graphics capability constructed in accordance with the principles of the present invention.

FIG. 1 illustrates a block diagram of graphics computer system 100 which is constructed in accordance with the principles of the present invention. Graphics computer system 100 includes host processing system 110, graphics processor 120, memory 130, shift register 140, video palette 150, digital to video converter 160 and video display 170.

Host processing system 110 provides the major computational capacity for the graphics computer system 100. Host processing system 110 preferably includes at least one microprocessor, read only memory, random access memory and assorted peripheral devices for forming a complete computer system. Host processing system 110 preferably also includes some form of input device, such as a keyboard or a mouse, and some form of long term storage device such as a disk drive. The details of the construction of host processing system 110 are conventional in nature and known in the art, therefore the present application will not further detail this element. The essential feature of host processing system 110, as far as the present invention is concerned, is that host processing system 110 determines the content of the visual display to be presented to the user.

Graphics processor 120 provides the major data manipulation in accordance with the present invention to generate the particular video display presented to the user. Graphics processor 120 is bidirectionally coupled to host processing system 110 via host bus 115. In accordance with the present invention, graphics processor 120 operates as an independent data processor from host processing system 110, however, it is expected that graphics processor 120 is responsive to requests from host processing system 110 via host bus 115. Graphics processor 120 further communicates with memory 130, and video palette 150 via video memory bus 122. Graphics processor 120 controls the data stored within video RAM 132 via video memory bus 122. In addition, graphics processor 120 may be controlled by programs stored in either video RAM 132 or read only memory 134. Read only memory 134 may additionally include various types of graphic image data, such as alphanumeric characters in one or more font styles and frequently used icons. In addition, graphics processor 120 controls the data stored within video palette 150. This feature will be further disclosed below. Lastly, graphics processor 120 controls digital to video converter 160 via video control bus 124. Graphics processor 120 may control the line length and the number of lines per frame of the video image presented to the user by control of digital to video converter 160 via video control bus 124.

Video memory 130 includes video RAM 132 which is bidirectionally coupled to graphics processor 120 via video memory bus 122 and read only memory 134. As previously stated, video RAM 132 includes the bit mapped graphics data which controls the video image presented to the user. This video data may be manipulated by graphics processor 120 via video memory bus 122. In addition, the video data corresponding to the current display screen is output from video RAM 132 via video output bus 136. The data from video output bus 136 corresponds to the picture element to be presented to the user. In the preferred embodiment video RAM 132 is formed of a plurality of TMS4161 64K dynamic random access integrated circuits available from Texas Instruments Corporation, the assignee of the present application. The TMS4161 integrated circuit includes dual ports, enabling display refresh and display update to occur without interference.

Shift register 140 receives the video data from video RAM 130 and assembles it into a display bit stream. In accordance with the typical arrangement of video random access memory 132, this memory consists of a bank of several separate random access memory integrated circuits. The output of each of these integrated circuits is typically only a single bit wide. Therefore, it is necessary to assemble data from a plurality of these circuits in order to obtain a sufficiently high data output rate to specify the image to be presented to the user. Shift register 140 is loaded in parallel from video output bus 136. This data is output in series on line 145. Thus shift register 140 assembles a display bit stream which provides video data at a rate high enough to specify the individual dots within the raster scanned video display.

Video palette 150 receives the high speed video data from shift register 140 via bus 145. Video palette 150 also receives data from graphics processor 120 via video memory bus 122. Video palette 150 converts the data received on bus 145 into a video level output on bus 155. This conversion is achieved by means of a lookup table which is specified by graphics processor 120 via video memory bus 122. The output of video palette 150 may comprise color hue and saturation for each picture element or may comprise red, green and blue primary color levels for each pixel. The table of conversion from the code stored within video memory 132 and the digital levels output via bus 155 is controlled from graphics processor 120 via video memory bus 122.

Digital to video converter 160 receives the digital video information from video palette 150 via bus 155. Digital to video converter 160 is controlled by graphics processor 120 via video control bus 124. Digital to video converter 160 serves to convert the digital output of video palette 150 into the desired analog levels for application to video display 170 via video output 165. Digital to video converter 160 is controlled for a specification of the number of pixels per horizontal line and the number of lines per frame, for example, by graphics processor 120 via video controller bus 124. Data within graphics processor 120 controls the generation of the synchronization and blanking signals and the retrace signals by digital to video converter 160. These portions of the video signal are not specified by the data stored within video memory 132, but rather form the control signals necessary for specification of the desired video output.

Lastly, video display 170 receives the video output from digital to video converter 160 via video output line 165. Video display 170 generates the specified video image for viewing by the operator of graphics computer system 100. It should be noted that video palette 150, digital to video converter 160 and video display 170 may operate in accordance to two major video techniques. In the first, the video data is specified in terms of color hue and saturation for each individual pixel. In the other technique, the individual primary color levels of red, blue and green are specified for each individual pixel. Upon determination of the design choice of which of these major techniques to be employed, video palette 150, digital to converter 160 and video display 170 must be constructed to be compatible to this technique. However, the principles of the present invention in regard to the operation of graphics processor 120 are unchanged regardless of the particular design choice of video technique.

Figure 2:
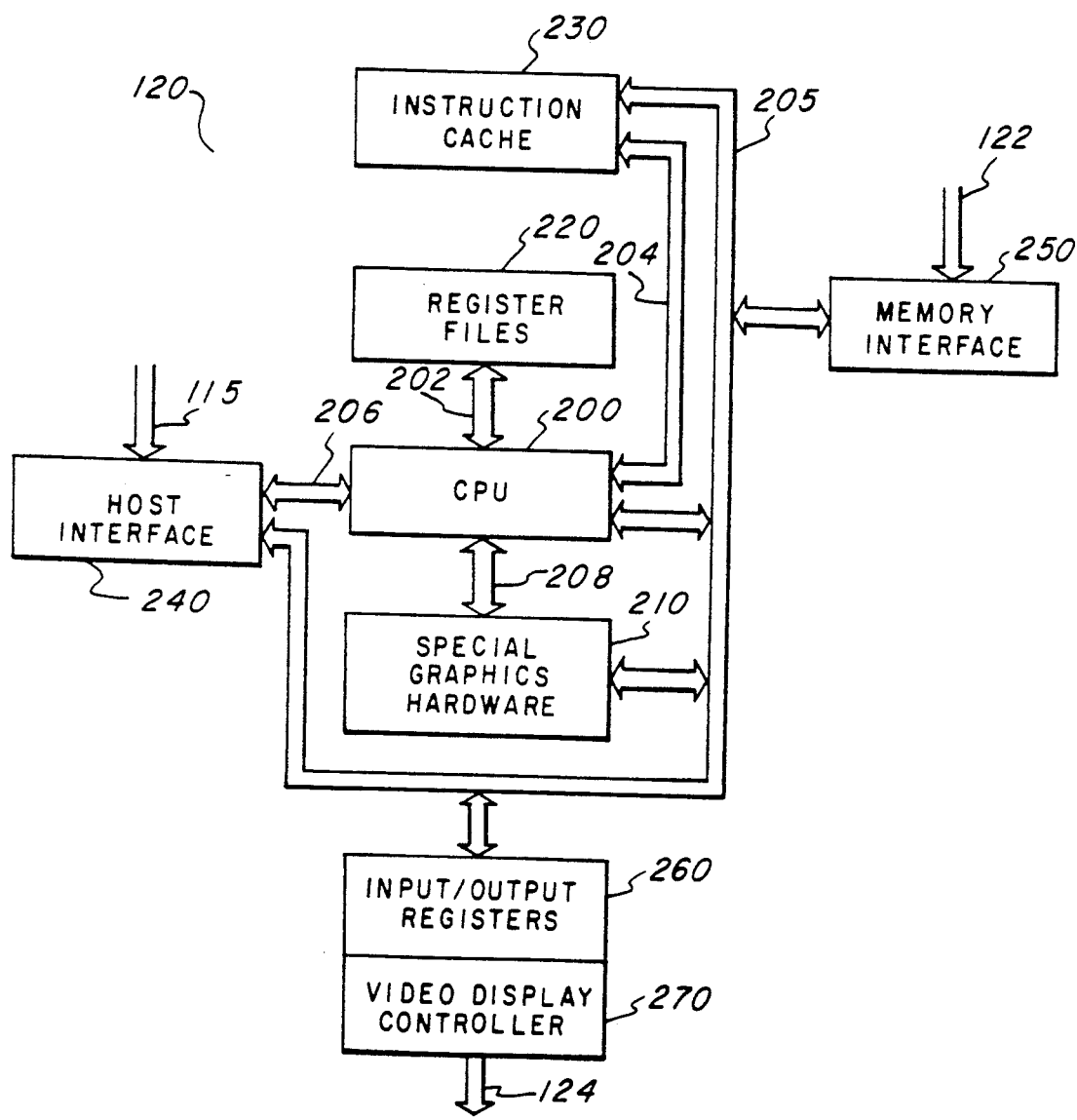
FIG. 2 illustrates the block diagram of a preferred embodiment of the graphics processing circuit of the present invention.

FIG. 2 illustrates graphics processor 120 in further detail. Graphics processor 120 includes central processing unit 200, special graphics hardware 210, register files 220, instruction cache 230, host interface 240, memory interface 250, input/output registers 260 and video display controller 270.

The heart of graphics processor 120 is central processing unit 200. Central processing unit 200 includes the capacity to do general purpose data processing including a number of arithmetic and logic operations normally included in a general purpose central processing unit. In addition, central processing unit 200 controls a number of special purpose graphics instructions, either alone or in conjunction with special graphics hardware 210.

Graphics processor 120 includes a major bus 205 which is connected to most parts of graphics processor 120 including the central processing unit 200. Central processing unit 200 is bidirectionally coupled to a set of register files, including a number of data registers, via bidirectional register bus 202. Register files 220 serve as the depository of the immediately accessible data used by central processing unit 200. As will be further detailed below, register files 220 includes in addition to general purpose registers which may be employed by central processing unit 200, a number of data registers which are employed to store implied operands for graphics instructions.

Central processing unit 200 is connected to instruction cache 230 via instruction cache bus 204. Instruction cache 230 is further coupled to general bus 205 and may be loaded with instruction words from the video memory 130 via video memory bus 122 and memory interface 250. The purpose of instruction cache 230 is to speed up the execution of certain functions of central processing unit 200. A repetitive function or function that is used often within a particular portion of the program executed by central processing unit 200 may be stored within instruction cache 230. Access to instruction cache 230 via instruction cache bus 204 is much faster than access to video memory 130. Thus, the program executed by central processing unit 200 may be speeded up by preliminarily loading the repeated or often used sequences of instructions within instruction cache 230. Then these instructions may be executed more rapidly because they may be fetched more rapidly. Instruction cache 230 need not always contain the same sets of instructions, but may be loaded with a particular set of instructions which will be often used within a particular portion of the program executed by central processing unit 200.

Host interface 240 is coupled to central processing unit 200 via host interface bus 206. Host interface 240 is further connected to the host processing system 110 via host system bus 115. Host interface 240 serves to control the communication between the host processing system 110 and the graphics processor 120. Host interface 240 controls the timing of data transfer between host processing system 110 and graphics processor 120. In this regard, host interface 240 enables either host processing system 110 to interrupt graphics processor 120 or vice versa enabling graphics processor 120 to interrupt host processing system 110. In addition, host interface 240 is coupled to the major bus 205 enabling the host processing system 110 to control directly the data stored within memory 130. Typically host interface 240 would communicate graphics requests from host processing system 110 to graphics processor 120, enabling the host system to specify the type of display to be generated by video display 170 and causing graphics processor 120 to perform a desired graphic function.

Central processing unit 200 is coupled to special graphics hardware 210 via graphics hardware bus 208. Special graphics hardware 210 is further connected to major bus 205. Special graphics hardware 210 operates in conjunction with central processing unit 200 to perform special graphic processing operations. Central processing unit 200, in addition to its function of providing general purpose data processing, controls the application of the special graphics hardware 210 in order to perform special purpose graphics instructions. These special purpose graphics instructions concern the manipulation of data within the bit mapped portion of video RAM 132. Special graphic hardware 210 operates under the control of central processing unit 200 to enable particular advantageous data manipulations regarding the data within video RAM 132.

Memory interface 250 is coupled to major bus 205 and further coupled to video memory bus 122. Memory interface 250 serves to control the communication of data and instructions between graphics processor 120 and memory 130. Memory 130 includes both the bit mapped data to be displayed via video display 170 and instructions and data necessary for the control of the operation of graphics processor 120. These functions include control of the timing of memory access, and control of data and memory multiplexing. In the preferred embodiment, video memory bus 122 includes multiplexed address and data information. Memory interface 250 enables graphics processor 120 to provide the proper output on video memory bus 122 at the appropriate time for access to memory 130.

Graphics processor 120 lastly includes input/output registers 260 and video display controller 270. Input/output registers 260 are bidirectionally coupled to major bus 205 to enable reading and writing within these registers. Input/output registers 260 are preferably within the ordinary memory space of central processing unit 200. Input/output registers 260 include data which specifies the control parameters of video display controller 270. In accordance with the data stored within the input/output registers 260, video display controller 270 generates the signals on video control bus 124 for the desired control of digital to video converter 160. Data within input/output registers 260 includes data for specifying the number of pixels per horizontal line, the horizontal synchronization and blanking intervals, the number of horizontal lines per frame and the vertical synchronization blanking intervals. Input/output registers 260 may also include data which specifies the type of frame interlace and specifies other types of video control functions. Lastly, input/output registers 260 is a depository for other specific kinds of input and output parameters which will be more fully detailed below.

Graphics processor 120 operates in two differing address modes to address memory 130. These two address modes are X Y addressing and linear addressing. Because the graphics processor 120 operates on both bit mapped graphic data and upon conventional data and instructions, different portions of the memory 130 may be accessed most conveniently via differing addressing modes. Regardless of the particular addressing mode selected, memory interface 250 generates the proper physical address for the appropriate data to be accessed. In linear addressing, the start address of a field is formed of a single multibit linear address. The field size is determined by data within a status register within central processing unit 200. In X Y addressing the start address is a pair of X and Y coordinate values. The field size is equal to the size of a pixel, that is the number of bits required to specify the particular data at a particular pixel.

Figure 3:
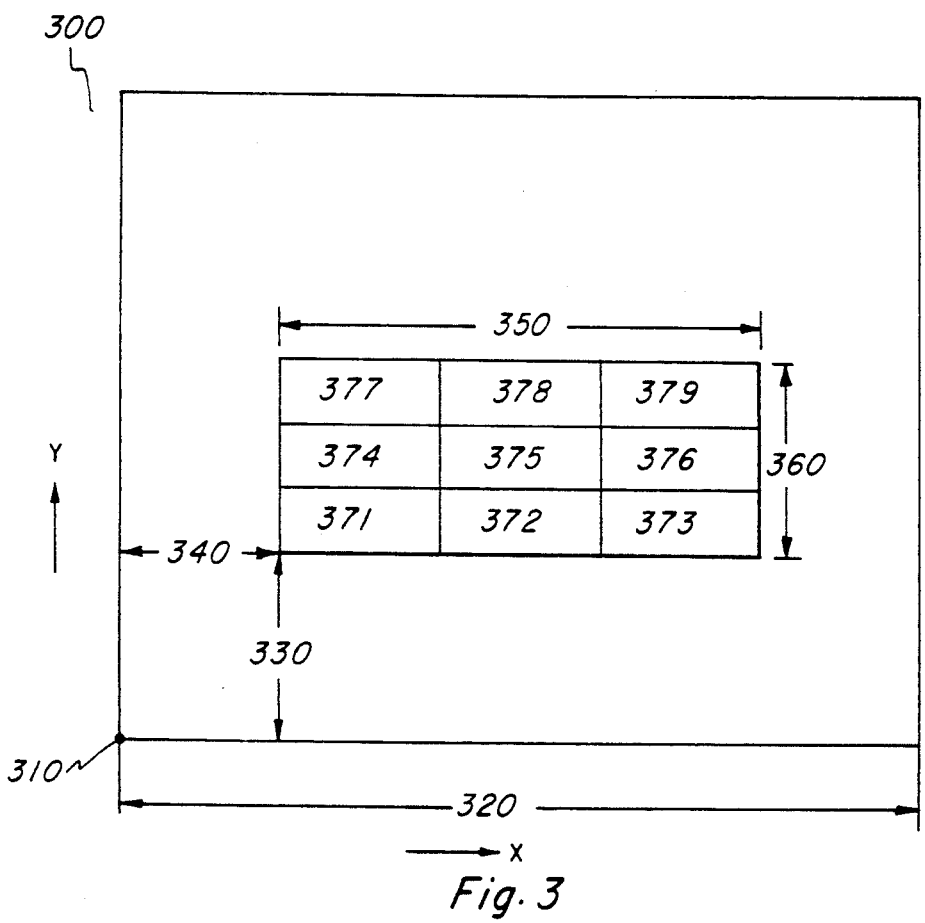
FIG. 3 illustrates the manner of specifying individual pixel addresses within the bit mapped memory in accordance with the X Y addressing technique.
Figure 4:
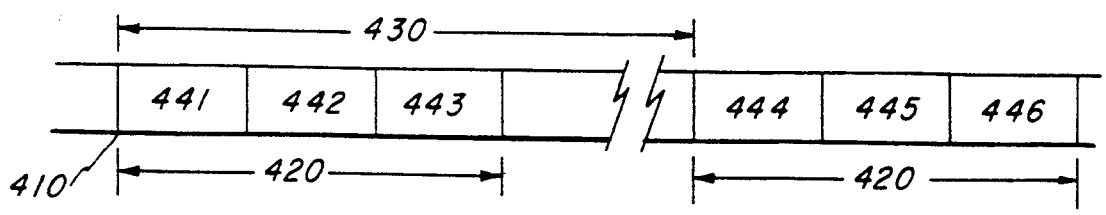
FIG. 4 illustrates a manner of specifying field addresses in accordance with the linear addressing technique.

FIG. 3 illustrates the arrangement of pixel data in accordance with an X Y addressing mode. Similarly, FIG. 4 illustrates the arrangement of similar data in accordance with the linear addressing mode. FIG. 3 shows origin 310 which serves as the reference point of the X Y matrix of pixels. The origin 310 is specified as a X Y start address and need not be the first address location within memory. The location of data corresponding to an array of pixels, such as a particular defined image element is specified in relation to the origin address 310. This includes an X start address 340 and a Y start address 330. Together with the origin, X start address 340 and Y start address 330 indicates the starting address of the first pixel data 371 of the particular image desired. The width of the image in pixels is indicated by a quantity delta X 350. The height of the image in pixels is indicated by a quantity delta Y 360. In the example illustrated in FIG. 3, the image includes nine pixels labeled 371 through 379. The last parameter necessary to specify the physical address for each of these pixels is the screen pitch 340 which indicates the width of the memory in number of bits. Specification of these parameters namely X starting address 340, Y starting address 330, delta X 350, delta Y 360 and screen pitch 320 enable memory interface 250 to provide the specified physical address based upon the specified X Y addressing technique.

FIG. 4 similarly illustrates the organization of memory in the linear format. A set of fields 441 to 446, which may be the same as pixels 371 through 376 illustrated in FIG. 3, is illustrated in FIG. 4. The following parameters are necessary to specify the particular elements in accordance with the linear addressing technique. Firstly, is the start address 410 which is the linear start address of the beginning of the first field 441 of the desired array. A second quantity delta X 420 indicates the length of a particular segment of fields in number of bits. A third quantity delta Y (not illustrated in FIG. 4) indicates the number of such segments within the particular array. Lastly, linear pitch 430 indicates the difference in linear start address between adjacent array segments. As in the case of X Y addressing, specification of these linear addressing parameters enables memory interface 250 to generate the proper physical address specified.

The two addressing modes are useful for differing purposes. The X Y addressing mode is most useful for that portion of video RAM 132 which includes the bit map data, called the screen memory which is the portion of memory which controls the display. The linear addressing mode is most useful for off screen memory such as for instructions and for image data which is not currently displayed. This latter category includes the various standard symbols such as alphanumeric type fonts and icons which are employed by the computer system. It is sometimes desirable to be able to convert an X Y address to a linear address. This conversion takes place in accordance with the following formula:

$$LA = OFF + (Y \times SP) + (X \times PS)$$

where: LA is the linear address; OFF is the screen offset, the linear address of the origin of the X Y coordinate system; Y is the Y address; SP is the screen pitch in bits; X is the X address; and PS is the pixel size in bits. Regardless of which addressing mode is employed, memory 250 generated the proper physical address for access to memory 130.

Figure 5:
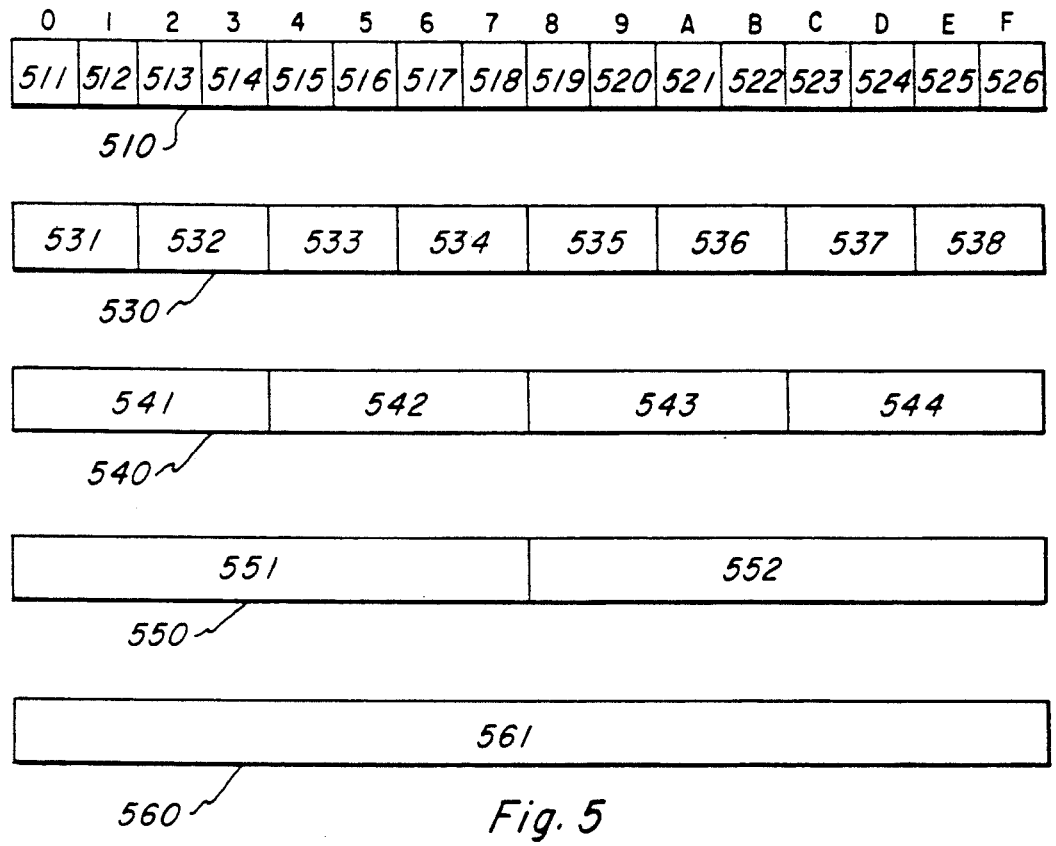
FIG. 5 illustrates the preferred embodiment of storage of pixel data of varying lengths within a single data word in accordance with the preferred embodiment of the present invention.

FIG. 5 illustrates the manner of pixel storage within data words of memory 130. In accordance with the preferred embodiment of the present invention, memory 130 consists of data words of 16 bits each. These 16 bits are illustrated schematically in FIG. 5 by the hexadecimal digits 0 through F. In accordance with the preferred embodiment of the present invention, the number of bits per pixel within memory 130 is an integral power of 2 but no more than 16 bits. As thus limited, each 16 bit word within memory 130 can contain an integral number of such pixels. FIG. 5 illustrates the five available pixel formats corresponding to pixel lengths of 1, 2, 4, 8 and 16 bits. Data word 510 illustrates 16 one bit pixels 511 to 516 thus 16 one bit pixels may be disposed within each 16 bit word. Data word 530 illustrates 8 two bit pixels 531 to 538 which are disposed within the 16 bit data word. Data word 540 illustrates 4 four bit pixels 541 to 544 within the 16 bit data word. Data word 550 illustrates 2 eight bit pixels 551 and 552 within the 16 bit word. Lastly, data word 560 illustrates a single 16 bit pixel 561 stored within the 16 bit data word. By providing pixels in this format, specifically each pixel having an integral power of two number of bits and aligned with the physical word boundaries, pixel manipulation via graphics processor 120 is enhanced. This is because processing each physical word manipulates an integral number of pixels. It is contemplated that within the portion of video RAM 132 which specifies the video display that a horizontal line of pixels is designated by a string of consecutive words such as illustrated in FIG. 5.

Figure 6:
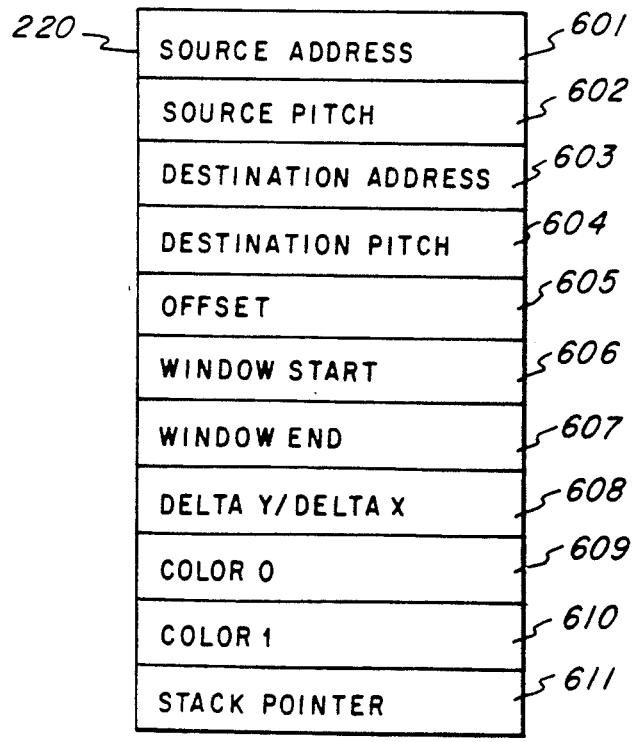
FIG. 6 illustrates the arrangement of contents of implied operands stored within the register memory in accordance with the preferred embodiment of the present invention.

FIG. 6 illustrates the contents of some portions of register files 220 which store implied operands for various graphics instructions. Each of the registers 601 through 611 illustrated in FIG. 6 are within the register address space of central processing unit 200 of graphics processor 120. Note, these register files illustrated in FIG. 6 are not intended to include all the possible registers within register files 220. On the contrary, a typical system will include numerous general purpose undesignated registers which can be employed by central processing unit 200 for a variety of program specified functions.

Register 601 stores the source address. This is the address of the lower left corner of the source array. This source address is the combination of X address 340 and Y address 330 in the X Y addressing mode or the linear start address 410 in the linear addressing mode.

Register 602 stores the source pitch or the difference in linear start addresses between adjacent rows of the source array. This is either screen pitch 340 illustrated in FIG. 3 or linear pitch 430 illustrated in FIG. 4 depending upon whether the X Y addressing format or the linear addressing format is employed.

Registers 603 and 604 are similar to registers 601 and 602, respectively, except that these registers include the destinations start address and the destination pitch. The destination address stored in register 603 is the address of the lower left hand corner of the destination array in either X Y addressing mode or linear addressing mode. Similarly, the destination pitch stored in register 604 is the difference in linear starting address of adjacent rows, that is either screen pitch 320 or linear pitch 430 dependent upon the addressing mode selected.

Register 605 stores the offset. The offset is the linear bit address corresponding to the origin of the coordinates of the X Y address scheme. As mentioned above, the origin 310 of the X Y address system does not necessarily belong to the physical starting address of the memory. The offset stored in register 605 is the linear start address of the origin 310 of this X Y coordinate system. This offset is employed to convert between linear and X Y addressing.

Registers 606 and 607 store addresses corresponding to a window within the screen memory. The window start stored in register 606 is the X Y address of the lower left hand corner of a display window. Similarly register 607 stores the window end which is the X Y address of the upper right hand corner of this display window. The addresses within these two registers are employed to determine the boundaries of the specified display window. In accordance with the well known graphics techniques, images within a window within the graphics display may differ from the images of the background. The window start and window end addresses contained in these registers are employed to designate the extent of the window in order to permit graphics processor 120 to determine whether a particular X Y address is inside or outside of the window.

Register 608 stores the delta Y/delta X data. This register is divided into two independent halves, the upper half (higher order bits) designating the height of the source array (delta Y) and the lower half (lower order bits) designating the width of the source array (delta X). The delta Y/delta X data stored in register 608 may be provided in either the X Y addressing format or in the linear addressing format depending upon the manner in which the source array is designated. The meaning of the two quantities delta X and delta Y are discussed above in conjunction with FIGS. 3 and 4.

Registers 609 and 610 each contain pixel data. Color 0 data stored in register 609 contains a pixel value replicated throughout the register corresponding to a first color designated color 0. Similarly, color 1 data stored in register 610 includes a pixel value replicated throughout the register corresponding to a second color value designated color 1. Certain of the graphics instructions of graphics processor 120 employ either or both of these color values within their data manipulation. The use of these registers will be explained further below.

Lastly, the register file 220 includes register 611 which stores the stack pointer address. The stack pointer address stored in register 611 specifies the bit address within video RAM 132 which is the top of the data stack. This value is adjusted as data is pushed onto the data stack or popped from the data stack. This stack pointer address thus serves to indicate the address of the last entered data in the data stack.

Figure 7:
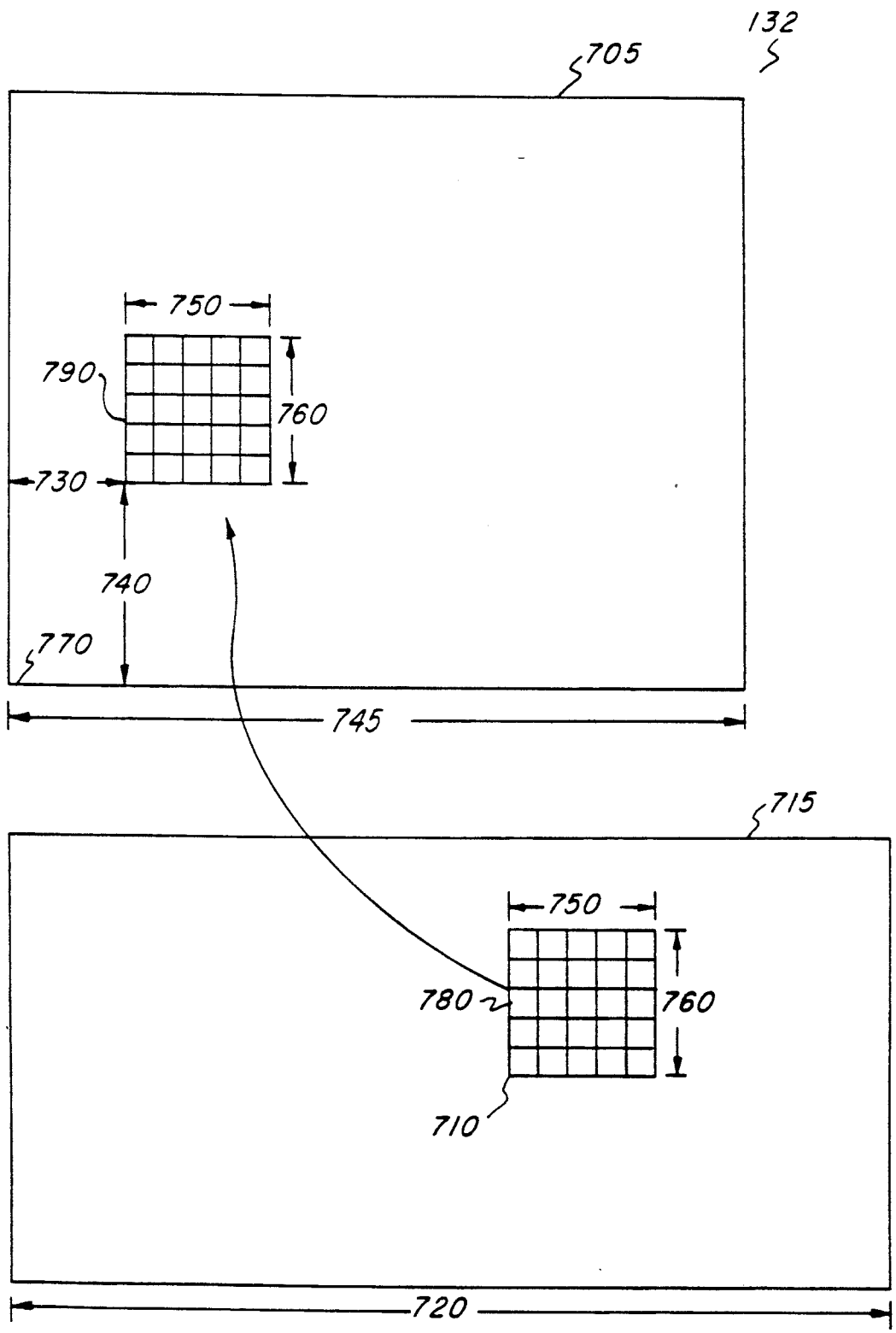
FIG. 7 illustrates the characteristics of an array move operation within the bit mapped memory of the present invention.

FIG. 7 illustrates in schematic form the process of an array move from off screen memory to screen memory. FIG. 7 illustrates video RAM 132 which includes screen memory 705 and off screen memory 715. In FIG. 7 an array of pixels 780 (or more precisely the data corresponding to an array of pixels) is transferred from off screen memory 715 to screen memory 705 becoming an array of pixels 790.

Prior to the performing the array move operation certain data must be stored in the designated resisters of register files 220. Register 601 must be loaded with the beginning address 710 of the source array of pixels. In the example illustrated in FIG. 7 this is designated in linear addressing mode. The source pitch 720 is stored in register 602. Register 603 is loaded with the destination address. In the example illustrated in FIG. 7 this is designated in X Y addressing mode including X address 730 and Y address 740. Register 604 has the destination pitch 745 stored therein. The linear address of the origin of the X Y coordinate system, offset address 770, is stored in register 605. Lastly, delta Y 750 and delta X 760 are stored in separate halves of register 608.

The array move operation illustrated schematically in FIG. 7 is executed in conjunction with the data stored in these registers of register file 220. In accordance with the preferred embodiment the number of bits per pixel is selected so that an integral number of pixels are stored in a single physical data word. By this choice, the graphics processor may transfer the array of pixels 780 to the array of pixels 790 largely by transfer of whole data words. Even with this selection of the number of bits per pixel in relation to the number of bits per physical data word, it is still necessary to deal with partial words at the array boundaries in some cases. However, this design choice serves to minimize the need to access and transfer partial data words.

In accordance with the preferred embodiment of the present invention, the data transfer schematically represented by FIG. 7 is a special case of a number of differing data transformations. The pixel data from the corresponding address locations of the source image and the destination image are combined in a manner designated by the instruction. The combination of data may be a logical function (such as AND or OR) or it may be an arithmetic function (such as addition or subtraction). The new data thus stored in the array of pixels 790 is a function of both the data of the array of pixels 780 and the current data of pixels 790. The data transfer illustrated in FIG. 7 is only a special case of this more general data transformation in which the data finally stored in the destination array does not depend upon the data previously stored there.

Figure 8:
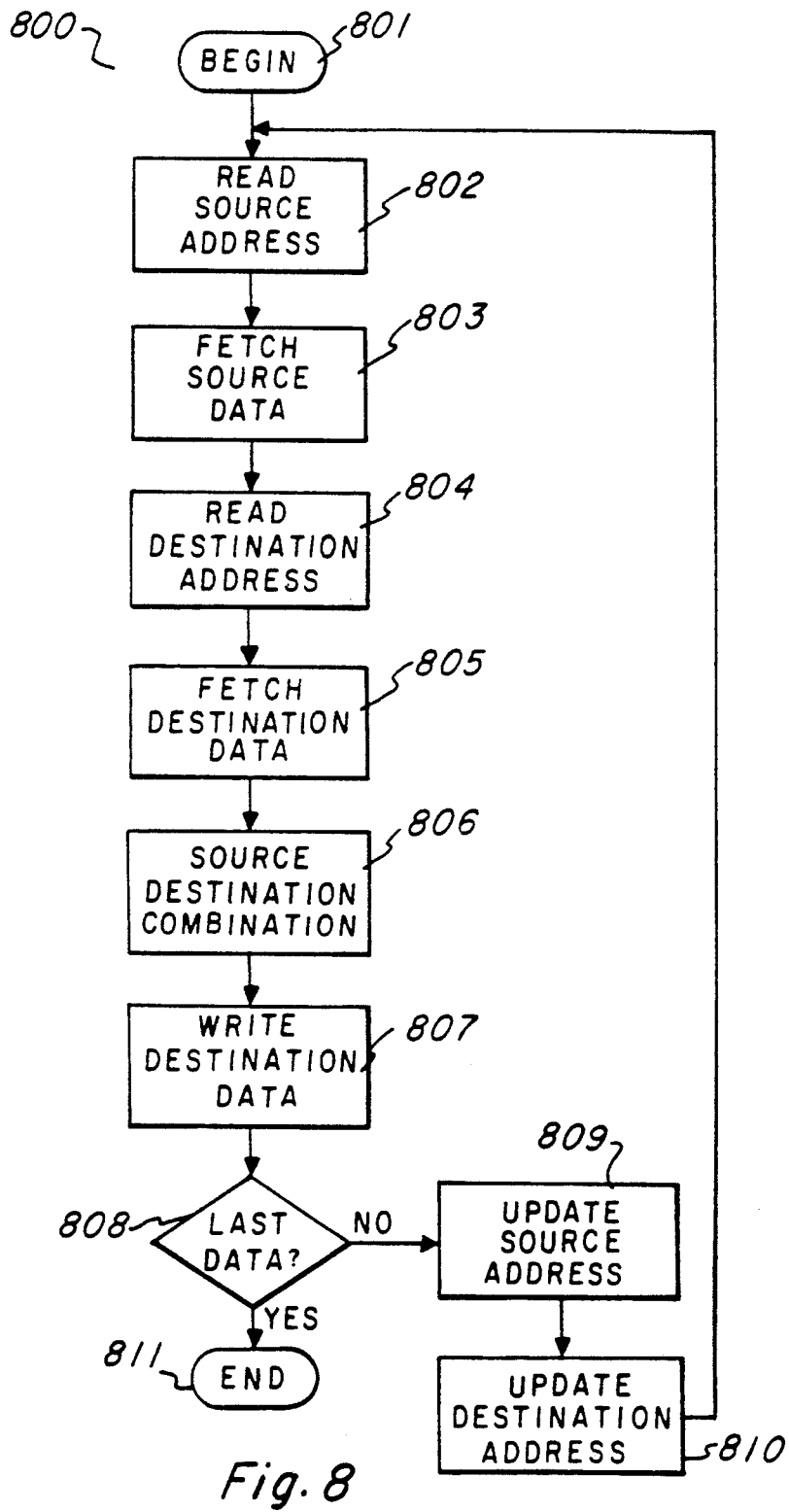
FIG. 8 illustrates a flow chart of a bit block transfer or array move operation in accordance with the present invention.

This process is illustrated by the flow chart in FIG. 8. In accordance with the preferred embodiment the transfer takes place sequentially by physical data words. Once the process begins (start block 801) the data stored in the register 601 is read to obtain the source address (processing block 802). Next graphics processor 120 fetches the indicated physical data word from memory 130 corresponding to the indicated source address (processing block 803). In the case that the source address is specified in the X Y format, this recall of data would include the steps of converting the X Y address into the corresponding physical address. A similar process of recall of the destination address from register 603 (processing block 804) and then fetching of the indicated physical data word (processing block 805) takes place for the data contained at the destination location.

This combined data is then restored in the destination location previously determined (processing block 806). The source and destination pixel data are then combined in accordance with the combination mode designated by the particular data transfer instruction being executed. This is performed on a pixel by pixel basis even if the physical data word includes data corresponding to more than one pixel. This combined data is then written into the specified destination location (processing block 807).

In conjunction with the delta Y/delta X information stored in register 608, graphics processor 120 determines whether or not the entire data transfer has taken place (decision block 808) by detecting whether the last data has been transferred. If the entire data transfer has not been performed, then the source address is updated. In conjunction with the source address previously stored in register 601 and the source pitch data stored in register 602 the source address stored in register 601 is updated to refer to the next data word to be transferred (processing block 809). Similarly, the destination address stored in register 603 is updated in conjunction with the destination pitch data stored in register 604 to refer to the next data word in the destination (processing block 810). This process is repeated using the new source stored in register 601 and the new destination data stored in register 603.

As noted above the delta Y/delta X data stored in register 608 is used to define the limits of the image to be transferred. When the entire image has been transferred as indicated with reference to the delta Y/delta X data stored in register 608 (decision block 808), then the instruction execution is complete (end block 811) and graphics processor 120 continues by executing the next instruction in its program. As noted, in the preferred embodiment this process illustrated in FIG. 8 is implemented in instruction microcode and the entire data transformation process, referred to as an array move, is performed in response to a single instruction to graphics processor 120.

Figure 9:
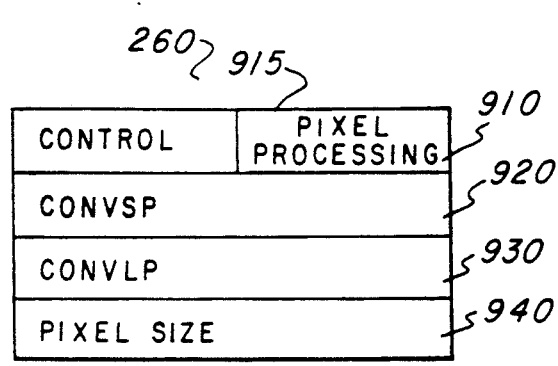
FIG. 9 illustrates some of the data which is stored in various registers of the set of input/output registers.

FIG. 9 illustrates a portion of input/output registers 260 which is employed to store data relevant to the X Y coordinate mode operations of the present invention. Firstly, input/output registers 260 includes a register 910 which stores a control word. This control word is used to specify types of operations performed by central processing unit 210. In particular, pixel processing bits 915 of the control word stored within register 910 specify the type of source-destination combination performed during array moves. As noted in regards to FIG. 8 and in particular to processing block 806, this combination of source and destination pixel data may include various logic and arithmetic functions. The particular combination executed is a function of the state of the pixel processing bits 915.

Registers 920 and 930 are employed to store data which is useful in converting between X Y and linear addresses. CONVSP data stored in register 920 is a precalculated factor employed to enable conversion from X Y addressing to linear addressing for screen pitch. This factor is:

$$16 + \log_2 \text{(screen pitch)}$$

In a similar fashion, the data CONVLP stored in register 930 is employed for conversion between X Y addressing and linear addressing for the linear pitch. This data corresponds to:

$$16 + \log_2 \text{(linear pitch)}$$

Storing this data in registers 920 and 930 in this manner enables central processing unit 200 to readily access this data in order to quickly implement the conversions between X Y addressing and linear addressing.

Register 940 has the pixel size data stored therein. The pixel size data indicates the number of bits per pixel within the displayable portion of video RAM 132. As previously noted in conjunction with FIG. 5, the pixel size is constrained by the preferred word size. In the preferred embodiment, the graphics processor of the present invention operates on 16 bit data words. The number of bits per pixel is constrained in the preferred embodiment to be an integral factor of 16, the number of bits per word. Thus, the number of bits per word could be one, two, four, eight or sixteen. Register 940 stores pixel size data which equals the number of bits per pixel selected. Thus, if a single bit per pixel has been selected, register 940 stores the numerical data 1. Similarly, if two-bit per pixel has been selected, then register 940 stores numerical data equal to 2. Likewise, other possible numbers of bits per pixel are indicated by the numeric values stored within register 940. This pixel size data is employed by central processing unit 200 in executing various instructions, particularly instructions requiring pixel processing.

Figure 10:
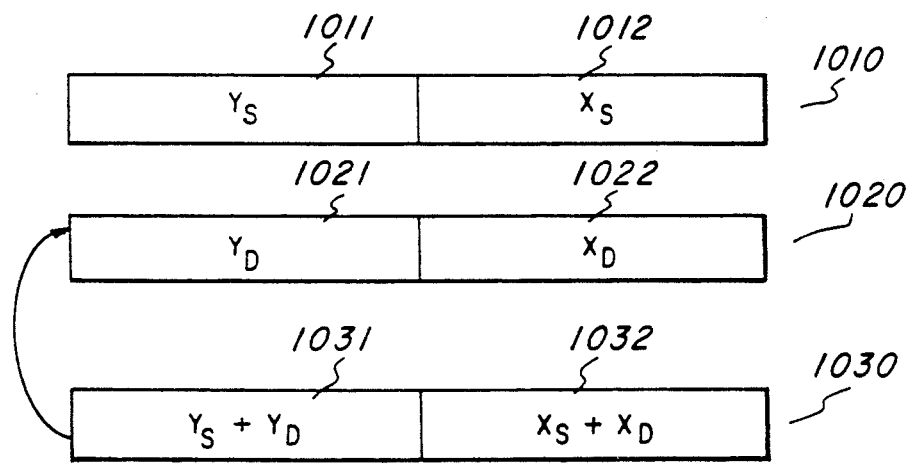
FIG. 10 illustrates diagrammatically the operation of the add registers instruction in the X Y coordinate mode.
Figure 11:
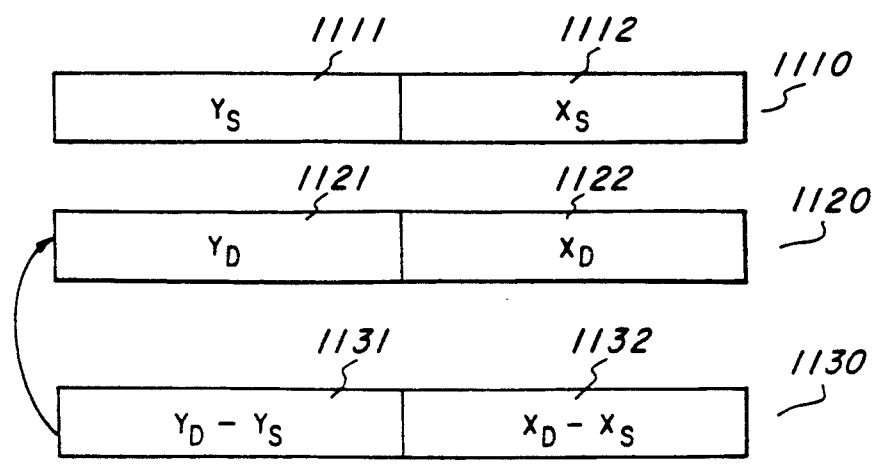
FIG. 11 illustrates diagrammatically the operation of the subtract registers instruction in the X Y coordinate mode.
Figure 13:
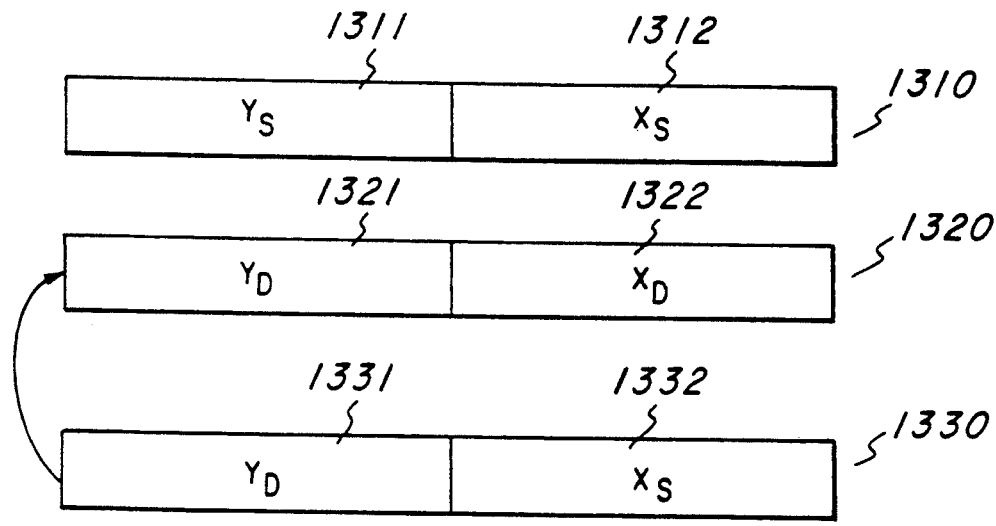
FIG. 13 illustrates diagrammatically the operation of the move X coordinate instruction.
Figure 14:
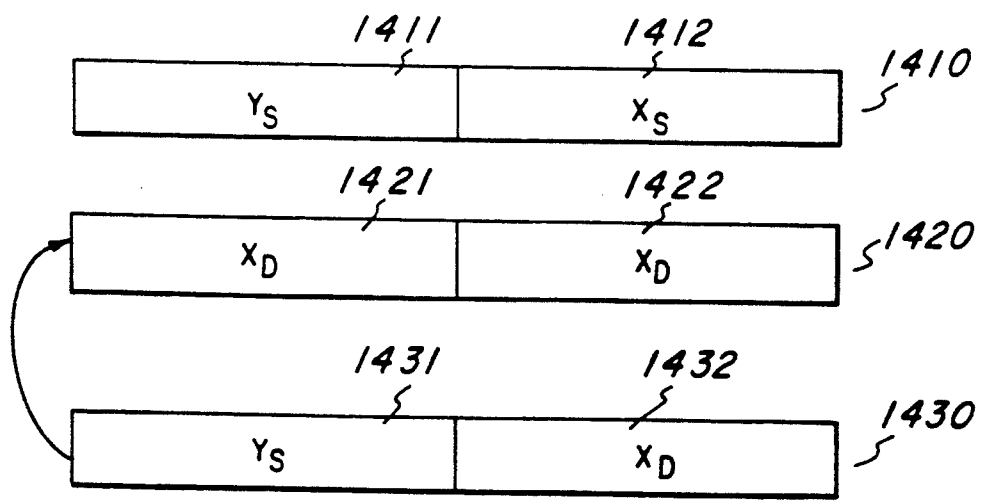
FIG. 14 illustrates diagrammatically the operation of the move Y coordinate instruction.
Figure 12:
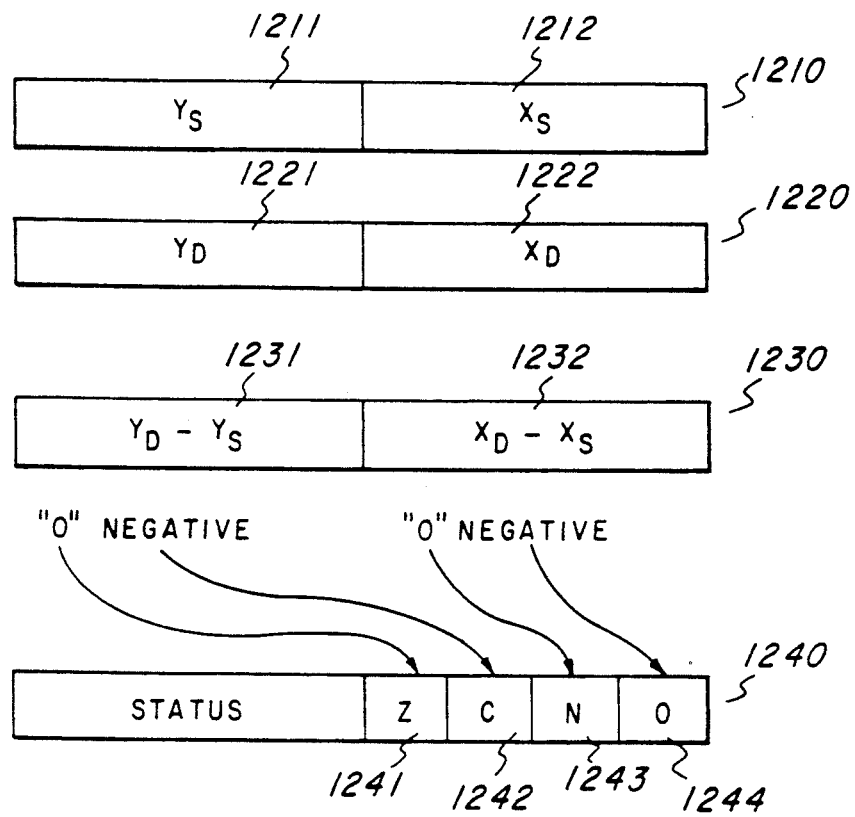
FIG. 12 illustrates diagrammatically the operation of the compare registers instruction in the X Y coordinate mode.

FIGS. 10 to 14 illustrate diagrammatically the manner of operation of various instructions in the X Y coordinate mode. FIG. 10 illustrates the operation of register addition in the X Y coordinate mode. FIG. 11 illustrates the operation of register subtraction in the X Y coordinate mode. FIG. 12 illustrates the manner of execution of a register compare instruction which separately compares the X and Y coordinates. FIG. 13 illustrates the operation of a move X coordinate instruction. Lastly, FIG. 14 illustrates the operation of a move Y coordinate instruction. Note that in each of the instruction operations illustrated in FIGS. 10 to 14 the instruction itself includes register fields which specify which of the plurality of registers included within register files 220 is the source register and which is the destination register.

As noted in the illustrations in FIGS. 10 to 14, the separate X and Y coordinates of the address of a particular pixel are stored in a single register. The X coordinate occupies the least significant bits of that register and the Y coordinate occupies the most significant bits. In accordance with the preferred embodiment, each register within register files 220 includes 32 bits. Also in accordance with the preferred embodiment the Y coordinate occupies the 16 most significant bits and X coordinate occupies the 16 least significant bits.

FIG. 10 illustrates the operation of addition of registers in the X Y coordinate mode. Registers 1010 and 1020 illustrate the state prior to the operation. Register 1010 includes Y coordinate 1011 and X coordinate 1012. Similarly, register 1020 includes Y coordinate 1021 and X coordinate 1022. As noted above, in the preferred embodiment, the Y coordinate of each register 1010 and 1020 occupies the 16 most significant bits and the X coordinate occupies the 16 least significant bits. The resultant is illustrated at 1030 which includes Y coordinated 1031 and X coordinate 1032. The Y coordinate 1031 is the sum of Y coordinate 1011 and Y coordinate 1021. In like manner, X coordinate 1032 is the sum of X coordinate 1012 and X coordinate 1022. In accordance with the preferred embodiment, this resultant 1030 is stored in the destination register 1020 replacing the original contents, as illustrated diagrammatically in FIG. 10. By this means the operation occupies only two of the registers of register files 220. This addition of the X and Y coordinates occurs completely independently. It should be noted that although the most significant bit of the X coordinate 1032 is adjacent to the least significant bit of the Y coordinate 1031, any carry generated by the X sum does not propagate to the least significant bit of the Y coordinate.

FIG. 11 illustrates the operation of subtraction of registers in the X Y coordinate mode. At the beginning of this operation register 1110 includes Y coordinate 1111 and X coordinate 1112. Likewise, register 1120 includes Y coordinate 1121 and X coordinate 1122. The resultant of this operation is illustrated at 1130. The Y coordinate 1131 is the difference of the Y coordinate 1121 and the Y coordinate 1111. In the same manner, the X coordinate 1132 is a difference of X coordinate 1122 and X coordinate 1112. As in the case of the register addition instruction illustrated in FIG. 10, this resultant 1130 may be stored in the destination register replacing the previous contents, thereby employing only two registers for this instruction.

FIG. 12 illustrates the operation of the register compare instruction in the X Y coordinate mode. The register compare instruction in the X Y coordinate mode begins like a register subtract instruction as illustrated in FIG. 11. The data in register 1210, including Y coordinate 1211 and X coordinate 1212, is subtracted from the data stored in register 1220, which includes Y coordinate 1221 and X coordinate 1222. The resultant data 1230 includes a Y coordinate 1231 which is a difference of the Y coordinates of the operands and has an X coordinate 1232 which is the difference between the X coordinates of the operands. Rather than storing this difference data in a register, as in the case of the subtract register in X Y coordinate mode instruction illustrated in FIG. 11, this data is used to set bits in the status register 1240.

Status register 1240 includes zero bit 1241, carry bit 1242, negative bit 1243 and overflow bit 1244. These bits are set or cleared based upon various comparisons made for particular instructions executed by central processing unit 200. In the case of the compare register in X Y coordinate mode instruction, the zero bit 1241 indicates whether the Y coordinate difference is 0. The carry bit 1242 indicates whether the Y coordinate difference is negative. Likewise, the negative bit 1243 indicates whether or not the X coordinate difference is 0. Lastly, the overflow bit 1244 indicates whether or not the X coordinate difference is negative. These various comparison outputs come from the outputs of the arithmetic logic unit which performs these subtractions, as will be further detailed below in conjunction with FIG. 15. The resultant data 1230 is not stored in any register, and the operand data from the registers 1210 and 1220 is unchanged.

FIG. 13 illustrates the operation of a move X coordinate instruction. As before the operation is begun with a source register 1310 having a Y coordinate of 1311 and X coordinate 1312 and destination register 1320 have a Y coordinate 1321 and a X coordinate 1322. In this case the resultant 1330 includes a Y coordinate 1331 identical to the destination Y coordinate 1321 and a X coordinate 1332 identical coordinate of the source 1312. This operation is conceptually the movement of the X coordinate 1213 of the source register into the destination register. As before in the case of the add register instruction and the subtract register instruction, in the preferred embodiment the resultant data 1330 is stored in the desination register 1320.

FIG. 14 illustrates the operation of the move Y coordinate instruction. This instruction is similar to the move X coordinate instruction illustrated in FIG. 13 except that the coordinates are reversed. Source register 1410 includes Y coordinate 1411 and X coordinate 1412. Destination register 1420 includes Y coordinate 1421 and X coordinate 1422. After the move Y instruction the resultant data 1430 includes Y coordinate 1431 identical to the Y coordinate 1411 of the source register and X coordinate 1432 identical to the X coordinate 1422 of the destination register. This can be conceptualized as moving the Y coordinate of the source register into the destination register. As in the cases stated above, in the preferred embodiment the resultant data 1340 is stored in the destination register 1420.

Figure 15:
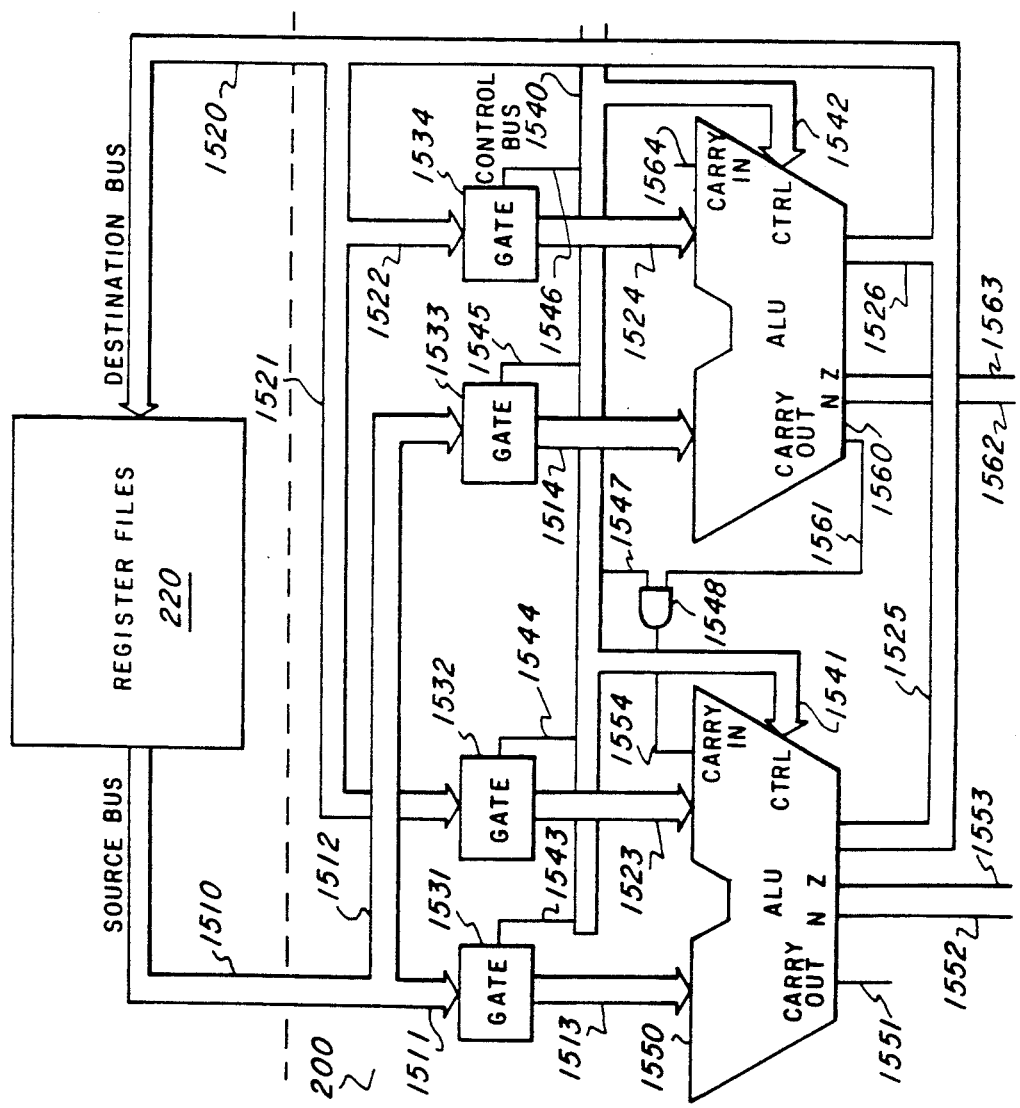
FIG. 15 illustrates the details of central processing unit 200 which enable separate manipulation of the X and Y coordinates of registers.

FIG. 15 illustrates the structures which enable the performance of the instructions in the X Y coordinate mode illustrated in FIGS. 11 to 14. FIG. 15 includes register files 220, source bus 1510 and destination bus 1520, both of which are a part of bus 202 illustrated in FIG. 2, and additional structures below the dashed line in FIG. 15 which form a portion of central processing unit 200. Central processing unit 200 includes a plurality of bus gates 1531, 1532, 1533, and 1534, a control bus 1540, an AND gate 1548 and arithmetic logic units 1550 and 1560.

The separate treatment of X and Y coordinates for register to register arithmetic in accordance with the present invention is achieved in the preferred embodiment by a separation of the most significant bits and the least significant bits for each register. The most significant bits from each register are applied to arithmetic logic unit 1550 and the least significant bits from each register are applied to arithmetic register 1560. Control bus 1540, whose state corresponds to the instruction being executed, controls the operation of arithmetic logic 1550 and arithmetic logic unit 1560 as well as the operation of gate circuits 1531, 1532, 1533, 1534 and 1548 in order to achieve the desired result in the X Y coordinate mode.

The structure illustrated in FIG. 15 will now be described in detail. Register files 220 includes a plurality of registers, each of which may be employed to store an address expressed in the X Y coordinate mode. Register files 220 is connected to central processing unit 200 via a source bus 1510 and a destination bus 1520. In this regard both source bus 1510 and destination bus 1520 are part of the bus 202 illustrated in FIG. 2.

Source bus 1510 enables transmission of data from a selected register within register files 220 to the central processing unit 200. Within central processing unit 200 this source bus 1510 is broken into a most significant source bus 1511 and a least significant source bus 1512. The most significant source bus 1511 is connected to gate 1531 and hence to arithmetic logic unit 1550 via bus 1513. Similarly, the least significant source bus 1512 is applied to gate 1533 and hence to arithmetic logic unit 1560 via bus 1514.

A bidirectional destination bus 1520 also connects register files 220 to central processing unit 200. Destination bus 1520 differs from source bus 1510 in that destination bus 1520 enables bidirectional coupling between register files 220 and central processing unit 200, thus the resultant data from a central processing unit operation can be stored in register files 220 via destination bus 1520. Data recalled by register files 220 and applied to central processing unit 200 is split into 2 busses. The most significant destination bus 1521 couples the most significant bits of the data from the destination bus 1520 to gate 1532. Gate 1532 is further connected to the second input of arithmetic logic unit 1550 via bus 1523. In like manner the least significant destination bus 1522 is coupled to gate 1534 and hence to arithmetic logic unit 1560 via bus 1524. Destination bus 1520 is coupled to the output of arithmetic logic units 1550 and 1560. The output from arithmetic logic unit 1550, comprising the most significant bits of the result, are coupled to destination bus 1520 via bus 1525. Similarly, the least significant bits of the result, coming from arithmetic logic unit 1560, are coupled to destination bus 1520 via bus 1526.

Control bus 1540 serves to control the functions of gates 1531 to 1534, arithmetic logic units 1550 and 1560 and the carry path gate 1548. Control bus 1540 includes a plurality of lines which are controlled by the particular instruction currently being executed. Control bus 1540 is driven by an instruction decode device which generates signals in accordance with the current instruction being executed in a manner well known in the art.

Control bus 1540 controls gates 1531 to 1534. Control bus 1540 controls whether gate 1531 is open, that is whether it applies the signals from bus 1511 to bus 1513, by control line 1543. Similarly, gate 1534 is controlled by control line 1544 from control bus 1540. Gate 1533 is controlled by control line 1545 and gate 1534 is controlled by control line 1546.

Control bus 1540 controls the operation of arithmetic logic units 1550 and 1560. Control bus 1540 includes a plurality of lines 1541 which are applied to the control input of arithmetic logic unit 1550. Arithmetic logic unit 1550 is capable of operating in a number of modes as determined by the signal appearing on control lines 1541. For example, arithmetic logic unit 1550 can operate to perform various logic functions, such as inversion, AND and OR, or arithmetic functions such as addition and subtraction. Arithmetic logic unit 1560 is similarly controlled by control bus 1540 via control lines 1542.

Lastly, control bus 1540 includes control line 1547 which controls AND gate 1548. This AND gate is in the carry path between arithmetic logic units 1550 and 1560. One input of AND gate 1548 comes from control line 1547. The other input of AND gate 1548 comes from the carry output of arithmetic logic unit 1560 via carry line 1561. Depending upon the state of control line 1547 AND gate 1548 either couples the carry output of arithmetic logic unit 1560 to the carry input of arithmetic logic unit 1550 via carry lines 1561 and 1554, or this carry output is blocked.

In addition to the data outputs of arithmetic logic units 1550 and 1560, each of these devices produces other outputs. Arithmetic logic unit 1550 generates a carry output on line 1551. In a like manner a carry output from arithmetic logic unit 1560 appears at carry line 1561. These two outputs indicate whether or not an arithmetic function of the respective arithmetic logic unit generates a "carry" output. In like manner arithmetic logic unit 1550 includes a negative output line 1552 and a zero output line 1553, with arithmetic logic unit 1560 includes a similar negative line 1562 and zero line 1563. The negative outputs of the respective arithmetic logic units indicate when the output data generated by the arithmetic logic unit is less than 0. In a like manner the zero outputs indicate when the output data generated by the respective arithmetic logic unit is equal to 0. These outputs are employed in conjunction with various instructions in order to set particular bits in the status register 1240. Note that arithmetic logic unit 1550 includes a carry output 1551 and arithmetic logic unit 1560 includes a carry input 1564. Because arithmetic logic unit 1550 operates on the most significant bits, the carry output 1551 is not connected. Similarly, because arithmetic logic unit 1560 corresponds to the least significant bits, the carry input 1564 is not connected.

TABLE 1

| Instruction | Gate 1531 | Gate 1532 | Gate 1533 | Gate 1534 | Gate 1548 | ALU Operation |
|---|---|---|---|---|---|---|
| Add Reg X Y | 1 | 1 | 1 | 1 | 0 | Addition |
| Sub Reg X Y | 1 | 1 | 1 | 1 | 0 | Subtract |
| Com Reg X Y | 1 | 1 | 1 | 1 | 0 | Subtract |
| Move X | 0 | 1 | 1 | 0 | X | Addition |
| Move Y | 1 | 0 | 0 | 1 | X | Addition |
| Add Reg | 1 | 1 | 1 | 1 | 1 | Addition |
| Sub Reg | 1 | 1 | 1 | 1 | 1 | Subtract |

"1" - passes signals
"0" - blocks signals
"X" - don't care

The operation of the circuit illustrated in FIG. 15 in conjunction with the X Y coordinate mode instructions will now be described in detail. Referring to Table 1, the state of gates 1531, 1532, 1533, 1534 and 1548 and the operation performed by both arithmetic logic units 1550 and 1560 is shown for each of the X Y coordinate mode instructions illustrated in FIGS. 10 to 14. When adding registers in the X Y coordinate mode gates 1531, 1532, 1533 and 1534 are set to pass their data to the respective busses 1513, 1523, 1514, and 1524. Gate 1548 is set to block the carry output from arithmetic logic unit 1560 from propagating to the carry input 1554 of arithmetic logic unit 1550. Note that control bus 1540 causes both arithmetic logic units 1550 and 1560 to perform an addition. In accordance with the preferred embodiment each register within register files 220 stores 32 bits. This 32 bits is divided into the 16 most significant bits which corresponds to the Y coordinate and the 16 least significant bits which corresponds to the X coordinate. Upon performance the add register in X Y coordinate mode instruction becomes two parallel 16 bit additions with the blocking of the carry output from arithmetic logic unit 1560 to the carry input of arithmetic logic unit 1550. In accordance with the preferred embodiment this result is stored back in the destination register in accordance with known principles. The feature which enables this separate addition of the X and Y coordinates is the provision of the AND gate 1548 which enables selective propagation of the carry output from arithmetic logic unit 1560 to arithmetic logic unit 1550.

The subtraction of registers in the X Y coordinate mode occurs in similar fashion as the addition. In this event, the arithmetic logic unit operation for both arithmetic logic units 1550 and 1560 specified by control bus 1540 is subtraction. The output of the respective arithmetic logic units 1550 and 1560, are thus the Y and X coordinates of the difference as noted in FIG. 11. In accordance with the preferred embodiment this difference is stored within the destination register within register files 220 via destination bus 1520. It is typical in arithmetic logic units of this type to perform such subtraction by 2's complement addition. In such an event one of the operands is converted into a 2's complement, and then normal addition occurs. Using this technique, the propagation of a carry bit to the next most significant bit is the equivalent to a borrowing operation during subtraction. Therefore, the blocking of the carry output from arithmetic logic unit 1560 to arithmetic logic unit 1550, in accordance with the "0" state of gate 1548, is the equivalent to preventing a borrowing operation. Thus the subtraction of the most significant bits and least significant bits occurs independently.

The comparison of registers in the X Y coordinate mode occurs in a manner similar to that of subtraction. However, the results are generated in a differing manner. Instead of the results being stored in a register within register files 220, as in the case of subtraction, various status outputs of arithmetic logic units 1550 and 1560 are employed to set particular bits within status register 1240. The zero output 1553 controls the zero bit 1241 of register 1240. If the output of arithmetic logic unit 1550 is 0 then zero bit 1241 is set, otherwise this bit is cleared. The negative output 1552 of arithmetic logic unit 1550 controls the carry bit 1242 of status register 1240. If the output of arithmetic logic unit 1550 is less than 0, as indicated by the negative output 1552, then carry bit 1242 is set otherwise it is cleared. In a similar manner, the zero output 1563 of arithmetic logic unit 1560 controls the negative bit 1243. Negative bit 1243 is set if the output of arithmetic logic unit 1560 is 0 as indicated by zero output 1563, it is cleared otherwise. Lastly, the negative output 1562 controls the overflow bit 1244 of status register 1240. If the output of arithmetic logic unit 1560 is negative then overflow bit 1244 is set, otherwise it is cleared. Note that preventing the carry output 1561 from propagating to the carry input 1544 enables the comparison to take place on the X and Y coordinates independently.

The move X coordinate instruction and the move Y coordinate instruction operate in a somewhat different manner then that previously described. These instructions operate by selectively opening and closing gates 1531, 1532, 1533, and 1534. In the move X coordinate instruction, the X coordinate of the source is inserted into the X coordinate of the destination. In the move X coordinate instruction gate 1531 is blocking, preventing the most significant bits of source bus 1510 from being applied arithmetic logic unit 1550. Similarly, gate 1534 is blocked preventing the least significant bits from the destination bus from being applied to arithmetic logic unit 1560. Thus arithmetic logic unit 1550 receives only the most significant bits of the destination bus via the most significant destination bus 1521 and gate 1532. Similarly, arithmetic logic unit 1560 receives only the least significant bits of the source bus via least significant source bus 1512 and gate 1533. The addition in arithmetic logic units 1550 and 1560 thus yields the most significant bits from the destination bus from the output of arithmetic logic unit 1550 and the least significant bits of the source bus at the output of arithmetic logic unit 1560. In accordance with the illustration in FIG. 13, this is the desired result of the move X coordinate instruction. Note that because there is no possibility of a carry being generated, the state of gate 1548 is unimportant.

The move Y coordinate instruction operates in a similar manner. Gate 1531 is open to pass the most significant bits from source bus 1510 to arithmetic logic unit 1550. The gate 1532 is blocking preventing the most significant bits of the destination bus 1520 from being applied to arithmetic logic unit 1550. Similarly, gate 1553 is blocking prevent the least significant bits from the source bus from being applied to arithmetic logic units 1550. Because gate 1534 is open, the least significant bits of the destination bus 1522 pass to the arithmetic logic unit 1560. Upon addition in the respective arithmetic logic units, the output of arithmetic logic unit 1550 is most significant bits of the source bus and the output of the arithmetic logic unit 1560 is the least significant bits of the destination bus. In accordance with the operation illustrated in FIG. 14, this is the desired output. Note again that the state of the gate 1548 is unimportant, because there is no possibility of generating a carry in such an operation.

Table 1 includes the states of the various gates in conjunction with the two normal register instructions. These are the add register instruction and the subtract register instruction. The difference between these instructions and the prior instructions which operate separately on X and Y coordinates, is in the carry gate 1548. In the case all normal arithmetic instructions, carry gate 1548 is open to pass the carry output 1561 from arithmetic logic unit 1560 to the carry input 1554 of arithmetic logic unit 1550. Thus, the combination illustrated in FIG. 15 operates normally in conjunction with ordinary register arithmetic instructions.

Figure 16:
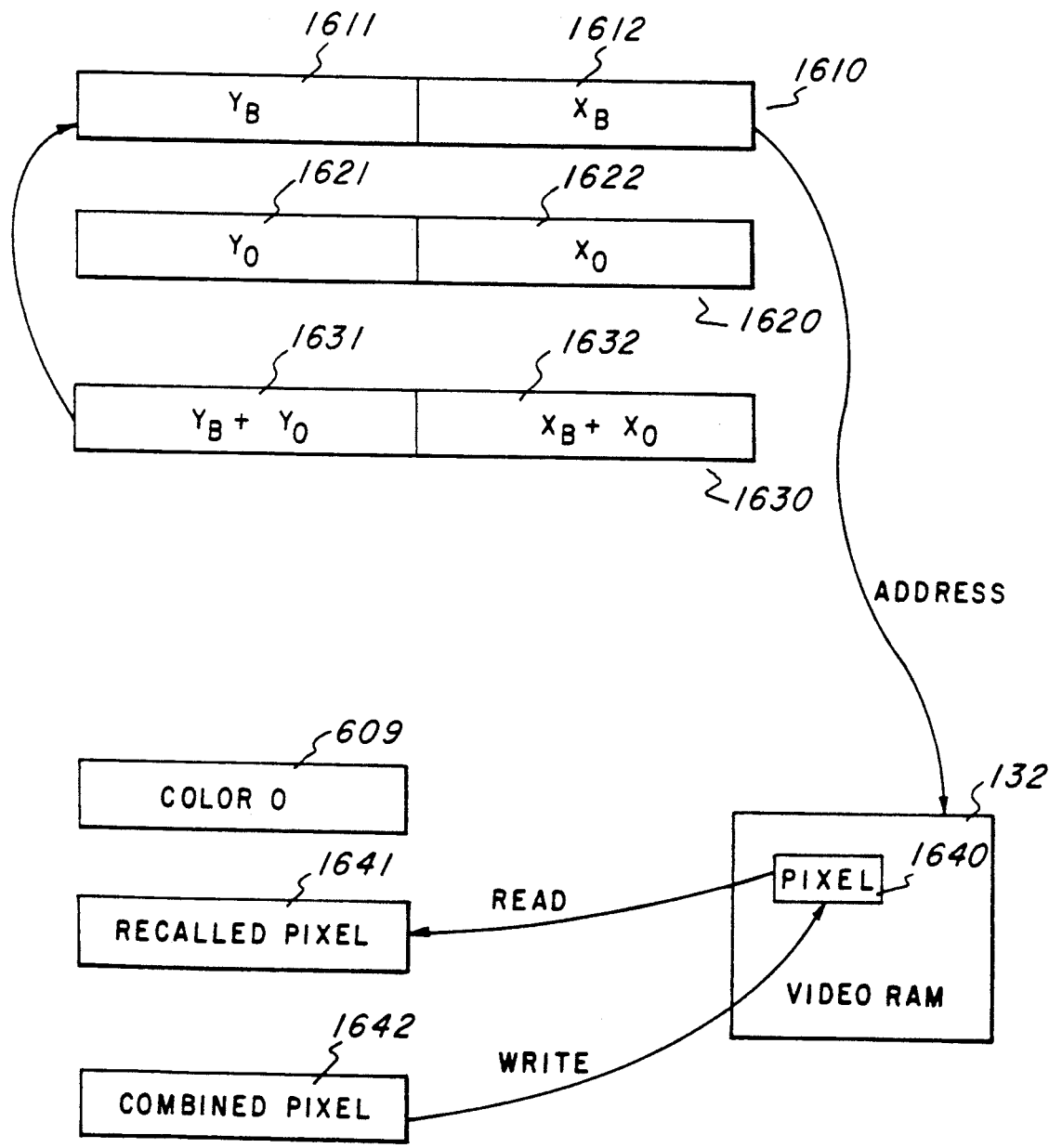
FIG. 16 illustrates diagrammatically the operation of the draw and advance instruction.

FIG. 16 illustrate the operation of a draw and advance instruction. In accordance with the draw and advance instruction, a predetermined color is written into a pixel within video random access memory 132 and an address is updated. FIG. 16 illustrates base coordinate register 1610 having a base Y coordinate 1611 and base X coordinate 1612. Together these X and Y coordinates designate the address of an individual pixel 1640 within video random access memory 132. FIG. 16 further illustrates offset register 1620 having an offset Y coordinate 1621 and an offset X coordinate 1622. In manner similar to that illustrated in the addition of registers in the X Y coordinate mode appearing in FIG. 10, a resultant is formed from the sum of the respective X and Y coordinates of the two 1610 and 1620. This resultant 1630 includes a Y coordinate 1631 which is the sum of the base Y coordinate and the offset Y coordinate an X coordinate 1632 which is the sum of the base X coordinate and the offset X coordinate. This resultant is stored back in the register 1610 as the updated base coordinates.

At the same time as this register addition occurs, a pixel operation also occurs. The individual pixel 1640 stored at the address corresponding to the base coordinates of register 1610 is recalled and becomes recalled pixel 1641. In accordance with the pixel processing option selected by the pixel processing bits 915 of control register 910, this recalled pixel 1641 is combined with the color 0 pixel stored in register 609 thereby generating a combined pixel 1642. This combined pixel 1642 is written into the address specified by the initial value of register 1610 replacing pixel 1640. This pixel processing operation occurs substantially simultaneously with the register addition operation. These operations can occur substantially simultaneously because the pixel processing operation takes place within special graphics hardware 210.

Figure 17:
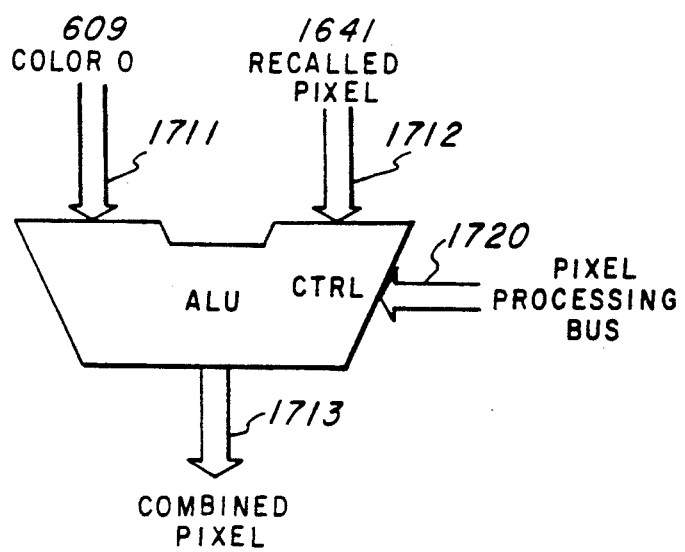
FIG. 17 illustrates the details of special graphics hardware 210 which enables the pixel processing.

FIG. 17 illustrates an additional arithmetic logic unit 1710 which is included within special graphics hardware 210. Arithmetic logic unit 1710 receives as one input on bus 1711 the color 0 data stored within register 609. The other input of arithmetic logic unit 1710 is the recalled pixel 1641 received on bus 1712. In accordance with the control function specified by pixel processing bus 1720, arithmetic logic unit 1710 generates a combined pixel output on bus 1713. This combined pixel output is then stored within the pixel 1640 designated by the address of the prior state of base coordinate register 1610. This prior state is preserved for both the read and the write operation by transferring the X Y coordinates from base register 1610 to memory interface 250 at the beginning of the instruction. Memory interface 250 then controls the address of the read and write operations. Note that the state of the pixel processing bus 1720 is not controlled by the particular instruction being executed. This is in contrast to the operation of control bus 1540 which controlled arithmetic logic units 1550 and 1560.

The pixel processing designated by the pixel processing bus 1720 can be any logical or arithmetic combination of the pixel data from the two sources. In the simplest case, the data at pixel 1640 is replaced by the color 0 data stored in register 609. In such an event it is not necessary to recall the data from this pixel. In other cases it is necessary to recall the data from pixel 1640. The combination specified by pixel processing bus 1720 could be a logical combination such an AND or an OR or an arithmetic operation such as addition or subtraction.

The employment of the draw and advance instruction can greatly increase the speed at which a curve can be drawn from a mathematical description. Attention is particularly drawn to an ellipse drawing algorithm described in "An Efficient Ellipse-Drawing Algorithm" by Jerry R. Van Aken appearing in *IEEE Computer Graphics and Applications Journal*, September 1984. The algorithm described in this article can draw accurate ellipses employing only integer arithmetic. A key to this algorithm is the selection of one of two points for the next point to be drawn. This algorithm can be executed very efficiently employing the draw and advance instruction as just described using a pair of registers having differing offset coordinates. The respective offset coordinates stored in differing registers must correspond to the two choices for the next pixel to be drawn. The color to be drawn should be previously stored in the color 0 register 609. Once this preliminary set up is accomplished a simple branch between two draw and advance instructions designating differing offset coordinate registers enables efficient use of this algorithm The application of the draw and advance operation of the present invention is not limited to the particular algorithm discussed in the cited article, however. This instruction can be employed to great advantage in other algorithms as well. The offset X and Y coordinates can be either negative or positive, enabling the direction of "advance" of the base coordinates to be in any direction. As a very simple case, a broken straight line having any desired slope can be drawn by repetition of a single draw and advance instruction. The desired slope would be reflected in the relative magnitudes of the X and Y coordinates stored in the offset register. The use of several draw and advance instructions specifying the same base register and employing differing offset registers enables easy execution of test and branch drawing algorithms. The draw and advance instruction can also be used to great advantage with the X Y coordinate mode register instructions described above.

The provision of a pixel processing option enables the pixel to be changed in a number of desired fashions. In the simplest case a particular color code is placed at the indicated pixel regardless of its previous contents. Employing the pixel processing option with arithmetic combinations can be used to brighten or darken a multi-level monochrome display or operate to intensify or subdue the effect of a single color by operating on a single color plane. The provision of logical combinations enables various overlay and windowing effects.

In accordance with the description of the present invention, a manner of advantageously operating on X and Y coordinates for a bit mapped display has been shown. In many instances when operating on data within the bit map, the techniques described herein enable much greater computational utility because these techniques are optimized to perform useful tasks. Rather than attempt to program a general purpose microprocessor to perform X Y coordinate manipulation, the techniques shown in this application employ special hardware particularly adapted to perform tasks necessary for these applications. As a result greater computational power is achieved.

The claims are:

1. A graphics data processing device comprising:
A. X and Y arithmetic logic unit circuits both having source inputs, destination inputs, result outputs and control inputs, said source inputs being connected to respective portions of a source bus to receive respective X and Y portions of every display data address word carried on said source bus, said destination inputs and result outputs being connected to the same respective X and Y portions of a destination bus and said control inputs being connected to the same control bus, a carry/borrow output of one arithmetic logic unit circuits being connected to a carry/borrow input of the other arithmetic logic unit circuits through gating circuits that are also connected to said control bus, said X and Y arithmetic logic unit circuits operating under control of said control bus at least to process respective X and Y display data addresses in single display data address words, with each word containing an X and Y address of a display data location, and with each location containing a display datum; and
B. further arithmetic logic unit circuits processing an addressed display datum simultaneously with said X and Y arithmetic logic circuits processing a display data address word for the next display datum to be addressed.

2. The device of claim 1 in which said certain arithmetic logic unit circuits include a color data input, a recalled data input, a combined data output and a control input, said certain arithmetic logic unit circuits operating in response to control input signals received on said control input to combine certain color data input signals with recalled data input signals obtained with said processed display data addresses to produce combined data output signals.

3. The device of claim 2 including a pixel processing control register (915) separate from said control bus and connected to the control input of said certain arithmetic logic unit circuits, said pixel processing control register containing said control input signals for operating said certain arithmetic logic unit circuits.

4. The device of claim 2 including a color register (609) connected to said color data input and containing said certain color data input signals to be combined with said recalled data input signals.

5. The structure of claim 2 including memory interface circuits connected to said processed display data addresses from both of said X and Y arithmetic and logic unit circuits, and connected to said recalled data input and said combined data output to access recalled data at memory locations indicated by said processed displayed data addresses and to return combined data to the same locations before accessing the next recalled data.

* * * * *